(No Model.)
W. W. HOPPER.
DIGGING SPADE OR FORK.
No. 567,391. Patented Sept. 8, 1896.
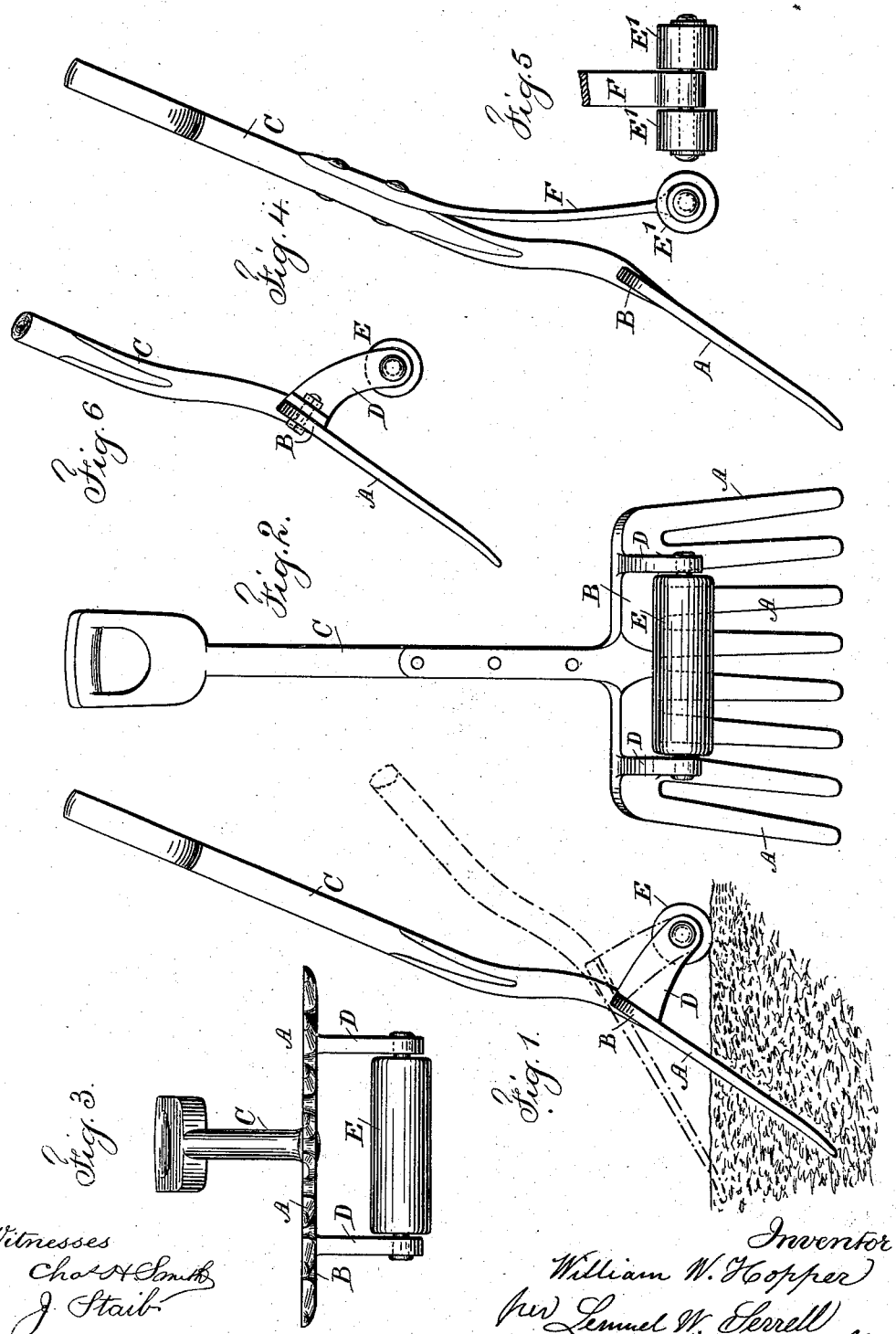
Witnesses
Chas. H. Smith
J. Staib
Inventor
William W. Hopper
per Lemuel W. Serrell
Atty

United States Patent Office.

WILLIAM W. HOPPER, OF ARCOLA, NEW JERSEY, ASSIGNOR, BY DIRECT AND MESNE ASSIGNMENTS, TO THE FULCRUM MANUFACTURING COMPANY, OF PATERSON, NEW JERSEY.

DIGGING SPADE OR FORK.

SPECIFICATION forming part of Letters Patent No. 567,391, dated September 8, 1896.

Application filed November 25, 1895. Serial No. 569,974. (No model.)

*To all whom it may concern:*

Be it known that I, WILLIAM W. HOPPER, a citizen of the United States, residing at Arcola, in the county of Bergen and State of New Jersey, have invented an Improvement in Digging Spades or Forks, of which the following is a specification.

Potato-diggers have been made with tines and handles and with wheels at opposite sides of the head of the tines upon which the fork is supported, as it may be rolled forward in shaking the earth from the potatoes, and a movable cross-piece, carrying wheels for a similar object, has been applied to an ordinary fork. In digging the earth for the purposes of cultivation it is often advantageous to employ tines with a handle sufficiently long for the leverage necessary to separate and lift the earth the tines so as to avoid the strain upon the muscles, especially of the back, in lifting bodily the clod of earth and turning it over.

In the present improvement I employ downwardly-projecting bearings at the back of the spade or fork, carrying a roller forming a pivot that rests upon the surface of the earth when the tines or prongs have been thrust into the earth the desired depth, so that the handle can be used as a lever and the backward projection as a fulcrum for raising up the earth upon the tines or blade and carrying the same forward, and in so doing the earth slides forward and is turned over and loosened, and it can be still further pulverized by rolling the implement forward on the pivot-rolls and thrusting the tines into the earth.

In the drawings, Figure 1 is an elevation edgewise of the spade or fork in the position for use. Fig. 2 is a rear elevation. Fig. 3 a view endwise of the tines. Fig. 4 shows a modification in the connection or support for the fulcrum. Fig. 5 is a rear view of the fulcrum-rollers, and Fig. 6 shows a modification in the shape of the pivot bearings.

The length of the blade or tines A may vary according to the use to which the implement is to be put, and it is generally advantageous to spread the tines so that the outer tines diverge slightly, as shown in Fig. 2, and the head B of the tines is permanently connected with the handle C in any desired or usual manner, and at the back of the fork or blade there are downwardly-descending brackets D, forming at their ends bearings for the axis or pivot of the roll E, and this is located with reference to the lengths of the tines and the leverage desired when raising the earth upon the tines, that is to say, when the roller E is immediately behind the head, as shown in Figs. 1, 2, and 4, the tines have to be forced into the earth a greater distance before the roll E is brought upon the surface as a fulcrum than will be the case when the roller E is in the position indicated in Fig. 6, where it is farther down behind the fork and between the head B and the point of the tines, and in this case the spade or fork is adapted to the purposes of cultivating and digging. The brackets D, forming the bearings, may be made integral with the head B or attached thereto by screws or in any suitable manner, and in Fig. 4 I have represented the rollers E' as upon a bearing in the form of a spring or arm F, extending down from the back of the handle C, the spring or arm coming in between two comparatively short rollers adapted to rest upon the surface of the earth. In either of the forms the roll forms a support or pivot upon which the parts are swung after the tines have been inserted into the earth so as to lift the earth and turn it as the earth slides forward and off the ends of the tines or blade, and the fork can be moved forward on its roller-fulcrum and the tines or blade thrust into the earth and moved by the handle-lever so as to loosen up the soil and leave the same in the desired condition.

I claim as my invention—

1. The combination with the substantially straight digging fork or spade, of arms and a roller rigidly connected to and forming a pivot behind the blade or tines and between the head of the fork or spade and penetrating point thereof, substantially as set forth.

2. The combination with a substantially straight digging fork or spade of rigid bearings projecting backwardly from the head of such fork or spade, and a roller pivoted in the bearings and forming a fulcrum behind the spade or fork and between the head and the penetrating point thereof, substantially as set forth.

Signed by me this 22d day of November, 1895.

WM. W. HOPPER.

Witnesses:
GEO. T. PINCKNEY,
WILLIAM G. MOTT.